(12) United States Patent
Kirschner et al.

(10) Patent No.: US 8,010,873 B2
(45) Date of Patent: *Aug. 30, 2011

(54) SYSTEMS AND METHODS FOR EFFICIENT UNCORRECTABLE ERROR DETECTION IN FLASH MEMORY

(75) Inventors: Wesley A. Kirschner, Farmington, CT (US); Robert W. Sisson, Trumbull, CT (US); John A. Hurd, Torrington, CT (US); Gary S. Jacobson, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/763,563

(22) Filed: Apr. 20, 2010

(65) Prior Publication Data

US 2010/0205509 A1 Aug. 12, 2010

Related U.S. Application Data

(63) Continuation of application No. 11/436,171, filed on May 16, 2006, now Pat. No. 7,707,481.

(51) Int. Cl.
*G11C 29/00* (2006.01)

(52) U.S. Cl. ........................................ 714/763

(58) Field of Classification Search ............ 714/763
See application file for complete search history.

(56) References Cited

U.S. PATENT DOCUMENTS

| 5,357,527 | A | 10/1994 | Coates et al. | |
|---|---|---|---|---|
| 5,734,663 | A | 3/1998 | Eggenberger | |
| 6,041,001 | A | 3/2000 | Estakhri | |
| 6,334,201 | B1 * | 12/2001 | Sawaguchi et al. | 714/795 |
| 6,438,706 | B1 | 8/2002 | Brown | |
| 6,625,061 | B2 | 9/2003 | Higuchi | |
| 6,959,384 | B1 | 10/2005 | Serret-Avila | |
| 2004/0128511 | A1 | 7/2004 | Sun et al. | |
| 2005/0086504 | A1 | 4/2005 | You et al. | |
| 2006/0156187 | A1 * | 7/2006 | Wu et al. | 714/759 |
| 2006/0161567 | A1 | 7/2006 | Dwork et al. | |
| 2007/0150790 | A1 * | 6/2007 | Gross et al. | 714/763 |

FOREIGN PATENT DOCUMENTS

WO 2004/066296 8/2004

OTHER PUBLICATIONS

Renesas, Application Note, H8S/2215 Group, 0.35-um F-ZTAT Software ECC Programming., REJ06B0139-O200O/ Rev. 2.00 Mar. 2004, pp. 1-28.

* cited by examiner

*Primary Examiner* — Scott T Baderman
*Assistant Examiner* — Enam Ahmed
(74) *Attorney, Agent, or Firm* — George M. Macdonald; Charles R. Malandra, Jr.

(57) ABSTRACT

A system and method for efficient uncorrectable error detection in flash memory is described. A microcontroller including a non-volatile flash memory utilizes an Error Correction Code (ECC) having a certain error detection and correction bit strength. The user data is first processed by a hash function and hash data is stored with the user data. Then, the user data and hash data are processed by the ECC system. In detection, the hash ensures that a relatively low bit-strength ECC system did not incorrectly manipulate the user data. Such a hash integrity check provides an efficient, robust detection of incorrectly corrected user data resulting from errors beyond the correction but strength of the ECC system utilized.

20 Claims, 4 Drawing Sheets

SYSTEMS AND METHODS FOR EFFICIENT UNCORRECTABLE ERROR DETECTION IN FLASH MEMORY

CROSS-REFERENCE TO RELATED APPLICATION

This application is a continuation application of prior application Ser. No. 11/436,171, Filed: May 16, 2006 now U.S. Pat. No. 7,707,481, which application is hereby incorporated by reference in its entirety.

FIELD OF THE INVENTION

Present invention relates to a flash memory system and, more particularly, to a flash memory system utilizing a first error mechanism such as a 1-bit strength ECC and a second error mechanism such as an efficient data block level hash error detection mechanism.

BACKGROUND OF THE INVENTION

A flash memory device is an electrically rewritable non-volatile digital memory device that does not require power to retain its memory contents. Virtually all digital electronic devices utilize fast and reliable Random Access Memory (RAM) for working storage of data. Unfortunately, RAM is volatile and the storage is erased when power to the device is removed. Several non-volatile memory technologies have been developed in order to allow memory to be stored when there is no power applied to the device. Technologies such as ROM, PROM and UV-EPROM memory allow non-volatile storage, but are not easily reprogrammable. Early EEPROM memory allowed electrically erasable non-volatile memory that could be accessed at the bit level, but suffered from performance limitations. More recently, flash EEPROM memory has become ubiquitous. A typical flash memory device allows for a relatively large amount of storage and is capable of performing a write operation, a read operation, and an erase operation. The write and erase operations are generally performed on a block of data bytes. Today, flash EEPROM memory is ubiquitous and there are at least two major flash technologies in use including NAND and NOR technologies. Additionally, several form-factor flash memory module standards have evolved to meet the memory demands of portable compact electronic products.

Unfortunately, flash memory technologies do not allow for large numbers of reliable write/erase operations. For example, a typical flash memory portion of a microcontroller might be able to provide for only 100 write/erase cycles before a significant likelihood of a physical error in one of the data cells occurs. Due to the other desirable characteristics of flash memory, designers utilize the technology and create mechanisms to compensate for the relatively small number of available write cycles before the likelihood of hardware error.

In some systems, redundant memory cells are used to replace damaged cells. Method for managing flash memory defects that apparently use physical redundancy in the device are described in U.S. Pat. No. 6,438,706 B1 entitled On Chip Error correction for Devices in a Solid State Device, issued Aug. 20, 2002 to Brown and U.S. Pat. No. 6,625,061 B2 entitled Method of Managing a Defect in a Flash Memory, issued Sep. 23, 2003 to Higuchi, each of which is incorporated herein by reference.

Frequently, Error Correction Codes (ECC) are used to detect and/or correct bit errors in flash memory to greatly extend the useful life of the device despite a small number of hardware failures. Many flash memory ECC systems use a Hamming code. Strong Hamming codes can provide robust multi-bit error detection and correction, but such codes require significant memory space and processing overhead. Hamming codes are well known and not described herein in detail.

While digital cameras and other electronic devices use removable flash cards, certain microcontrollers incorporate Flash EEPROM memory on the device. For example, the Hitachi/Renesas 24 MHz H8S/2218UF 16 bit microcontroller. Such devices may employ ECC software. The Renesas Application Note entitled "H8S/2215 Group 0.35-µm F-ZTAT Software ECC Programming," note REJ06B0139-02000/Rev.2.00 dated March 2004 is incorporated herein by reference.

The Hamming code used in the traditional ECC implementation for the H8S/2218UF microcontroller is the (38, 32) Hamming code in which for every 4 bytes of data, the next byte includes 6 check bits (the other two bits in every fifth byte are undefined). Such a system provides for the correction of up to 1 bit in the 38 bits in the group.

Apparently due to the low probability of a multi-bit physical failure in a flash block, some flash ECC system designers have apparently designed guaranteed 1-bit error ECC correction systems that are very aggressive and that will attempt to correct more than 1 bit error in a block. Such multi-bit correction attempts may actually incorrectly perform a data correction operation without notice of such a failure to the user program. In certain secure data applications such as the preservation of postage funds, such incorrect data correction operations are not tolerable. This can be a very significant problem because an aggressive ECC algorithm will sometimes output a corrupted result. For example, it outputs a valid result that meets all the "checksums" of the ECC, but it is not the correct value.

Certain systems have been described that utilize stronger ECC systems to provide more reliable data. A method apparently for increasing data reliability of a flash memory modifies the flash memory device and is described in U.S. Pat. No. 6,041,001 entitled Method of Increasing Data Reliability of a Flash Memory Device Without Compromising Compatibility, issued Mar. 21, 2000 to Estakhri, which is incorporated herein by reference. However, strong ECC implementations require significant overhead in terms of memory space and processing time.

Accordingly, there is a need for efficient uncorrectable error detection in flash memory that provides robust error detection combined with low memory space and/or processing overhead.

SUMMARY OF THE INVENTION

A system and method for efficient uncorrectable error detection in flash memory is described. In an illustrative embodiment, a microcontroller including a non-volatile flash memory utilizes an Error Correction Code (ECC) having a certain error detection and correction bit strength. The user data is first processed by a hash function and hash data is stored with the user data. Then, the user data and hash data are processed by the ECC system. In detection, the hash ensures that a relatively low bit-strength ECC system did not incorrectly manipulate the user data. Such a hash integrity check provides an efficient, robust detection of incorrectly corrected user data resulting from errors beyond the correction but strength of the ECC system utilized.

In an illustrative embodiment, a method of increasing data reliability of a memory device utilizing a first error process resulting in a first error data and a second error process resulting in a second error data is provided. The process obtains a raw data block from the memory device including user data, first error process data and second error process data, wherein the second error process data was generated based upon the user data and the first error process data. The process also determines if the second error data is consistent with the user data and the first error data by utilizing the second error process. If the second error data is not consistent with the user data and the first error data, the process utilizes the second error process to generate corrected user data and corrected first error process data. The system determines if the first error data is consistent with the user data by utilizing the first error process. If the first error data is not consistent with the user data, then the process indicates a failure and halting operation, and if the first error data is consistent with the user data, then the process outputs the user data. As shown herein, additional illustrative embodiments are described and the data formats are illustrative.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

A system and method for efficient uncorrectable error detection in flash memory is described. Many flash memory algorithms today use an ECC (Error Correction Constant (or Code)) algorithm to provide for error correction and often to prolong the life of the flash memory device beyond the expected relatively short-term failure of a small number of bit locations. An ECC can compensate for bit errors in flash memory. The software algorithm reads the flash data and ECC to RAM. If the ECC verifies, there are no bad cells. If the ECC is not correct, the software can correct the cell that is not correct if there are not too many errors. The data correction includes cells in the data or cells in the ECC itself. However, ECC algorithms only have a certain bit strength depending on the length of the ECC and only a certain number of bits can be corrected. A problem arises if there are more bit errors than the number that can be corrected. The ECC may software may start to corrupt good cells in the flash memory.

The typical flash memory reliability problem relates to the physical performance parameters of the device. Typically, the problem is addressed by applying an ECC algorithm to the flash memory in order to maintain some (or a lot of) assurance that the output of the ECC is actually the correct value. However, the choice of the ECC bit strength is a trade-off of at least program execution speed, memory space resource allocation and error correction and detection robustness. Furthermore, there is an additional important problem in that certain designers have decided to implement an aggressive ECC algorithm will sometimes output a corrupted result—i.e., it outputs a valid result that meets all the "checksums" of the ECC, but it is not the correct value.

Figure 1:
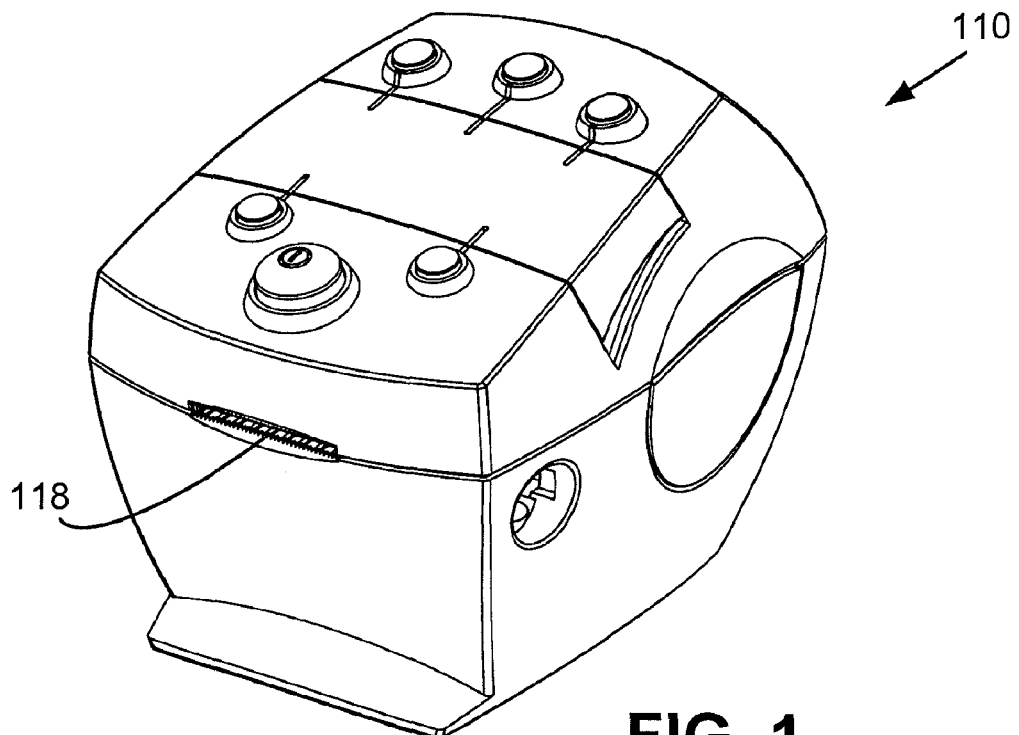
FIG. 1 is a perspective view of an illustrative thermal printer incorporating a microcontroller having flash memory in accordance with an illustrative embodiment of the present application.

Referring to FIG. 1, a perspective view of an illustrative thermal postage printer 110 incorporating a microcontroller having flash memory in accordance with an illustrative embodiment of the present application is shown. Thermal media that may incorporate indicia of postage or other value payment are printed at output port 118. In such a system including an embedded microcontroller using flash memory to store secure data such as postage payment related data including postal printing states, corrupt data could lead to the loss of funds. For example, corrupt flash memory or incorrect ECC correction manipulation may cause good and valuable postal states to be lost. Even if a failure were to lead to one cell being lost, it would be beneficial to not corrupt any other cells and allow the flash memory contents to be uploaded to another device that can correct the failure.

Figure 2:
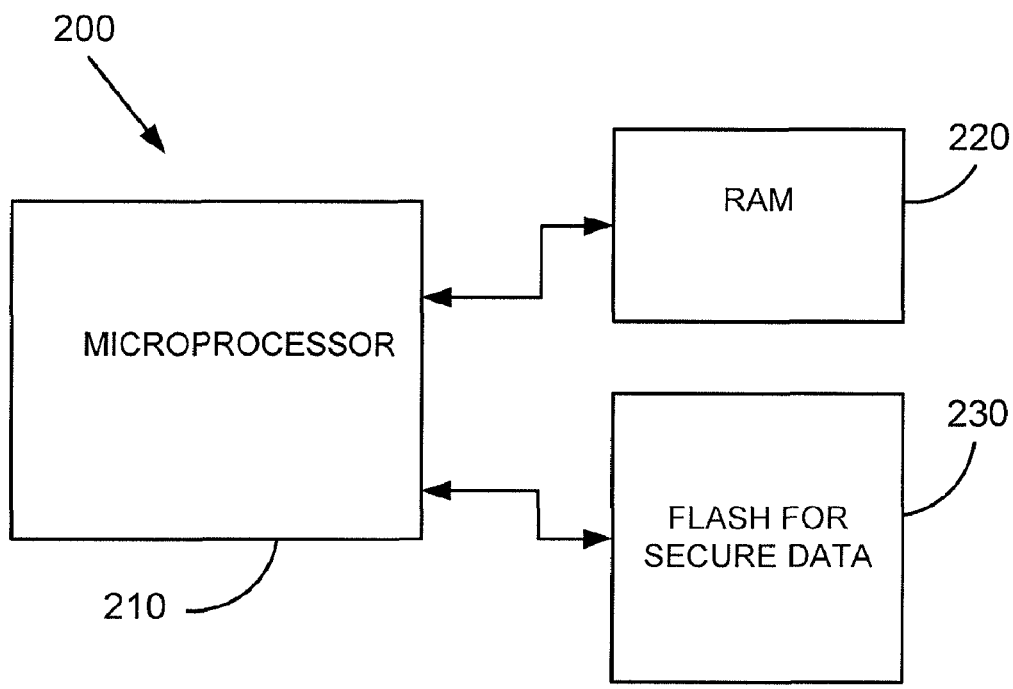
FIG. 2 is a block diagram of portions of the processing system of an illustrative embodiment of the present application.

Referring to FIG. 2, a block diagram of portions of the processing system 200 of an illustrative embodiment according to FIG. 1 of the present application is shown. A microprocessor 210 (or microcontroller) is used to store secure data in flash memory 230. In one embodiment, the microcontroller includes the 2218UF 16-bit microcontroller. RAM 220 is used for several purposes including scratch pad memory when manipulating variables. Part or all of each of the flash memory or RAM may be internal to the microprocessor or external depending on the application. In the illustrative embodiment, an embedded real time operating system CMX RTOS is utilized. Additionally, as can now be appreciated, such a system may not utilize a traditional commercial embedded operating system, but may rely instead on a main executable program. Such a system may provide increased performance without the overhead of an operating system. In an alternative embodiment, a non-RTOS operating system may be utilized such as an embedded open source or commercial operating system.

Figure 3:
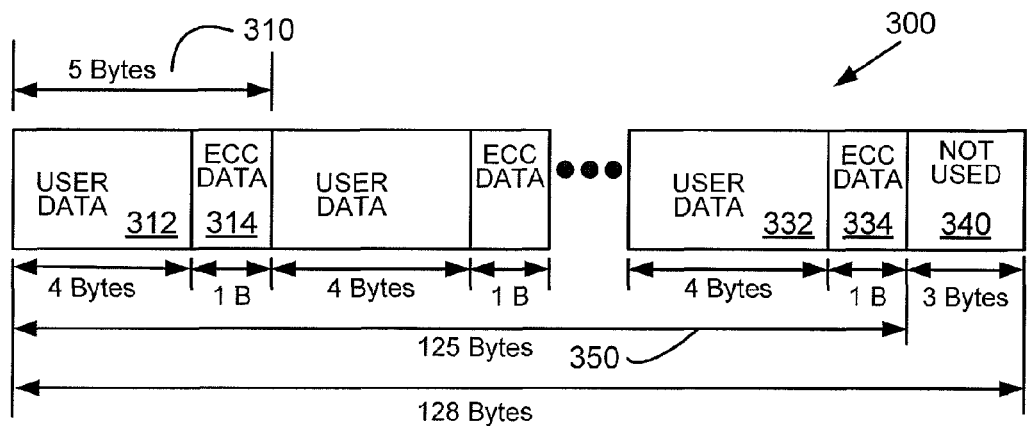
FIG. 3 is a block diagram of a flash memory data block format using traditional ECC.

Referring to FIG. 3, a block diagram of a 128 byte flash memory data block format 300 using traditional ECC is shown. User data 312 is 4 8-bit Bytes wide. A (38, 32) Hamming code is applied resulting in 6 bits that is stored in ECC data byte 314. The other 2 bits are not used. That 5 Byte ECC group 310 is then repeated 25 times ending in user data 332 and ECC data 334 resulting in 125 used bytes 350 in the block 300. Of the 125 used bytes, 100 bytes are used for User Data and 25 are used for ECC data.

The Hamming code used in the traditional ECC implementation for the H8S/2218UF microcontroller is the (38, 32) Hamming code in which for every 4 bytes of data, the next byte includes 6 check bits (the other two bits in every fifth byte are undefined). Accordingly, as shown in FIG. 3, in the typical 128 Byte Block of memory, there are 25 groups of 5 bytes, each including 4 bytes of data and 1 byte of ECC check bits. The last 3 bytes of the 128 Byte Block are not used. More sophisticated ECC algorithms such as ECC200 could be utilized, but such algorithms require more processing time to execute.

Figure 4:
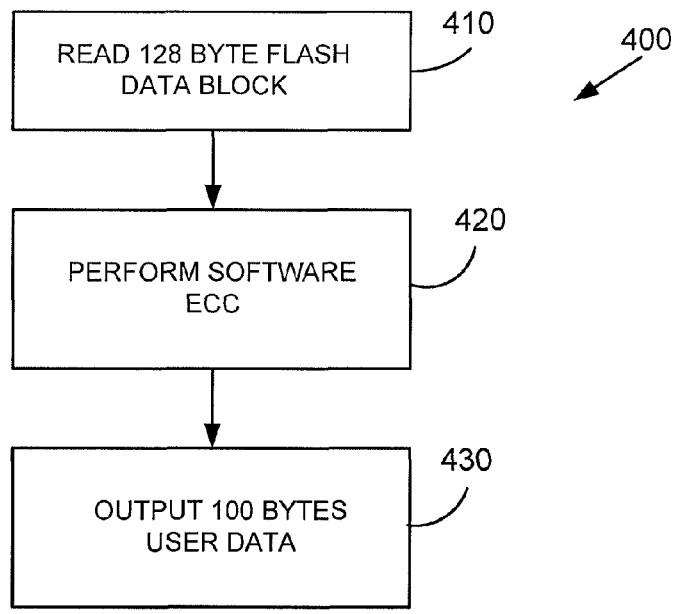
FIG. 4 is a flowchart of a flash memory read process using a traditional ECC.

Referring to FIG. 4, a flowchart of a flash memory read process 400 using a traditional ECC is shown. In step 410, the system reads a 128 Byte flash memory data block. The system then operates on each 5 byte ECC group to apply the ECC algorithm and perform error detection and correction. In step 430, the system outputs the ECC processed 100 bytes of user data.

In an illustrative embodiment, a microcontroller including a non-volatile flash memory utilizes an Error Correction Code (ECC) having a certain error detection and correction bit strength. The choice of the bit strength is a trade-off of at least program execution speed, memory space resource allocation and error correction and detection robustness. The flash memory is written in blocks of bytes such as a 128-byte block of data. Using a traditional Hamming Code (38, 32), every four bytes of data, the next byte is reserved for ECC data. Accordingly, there are then 25 ECC groups of 4 bytes data and one byte ECC data with the remaining 3 bytes typically unused. Such a system provides the ability to detect and correct 1 bit errors in the 5 byte ECC groups.

Certain aggressive ECC algorithms would attempt to correct greater than 1 bit errors with potential unknown correction errors. However, in an illustrative embodiment described herein, a second, efficient, error detection mechanism is employed. Here, the 100 bytes of user data is reconfigured to provide 97 bytes of user data and 3 bytes of hash data. The system processes all of the user data (the 97 bytes of data) by performing a hash function before the ECC is applied. The resulting 100 bytes of user data with hash data is then processed by the ECC process to provide 125 bytes of 5 byte ECC groups. Increasing the strength of the Hamming code would be computationally and memory space prohibitive. Here, the hash provides an efficient, robust detection of incorrectly corrected user data resulting from errors beyond the correction but strength of the ECC system utilized. If the ECC incorrectly manipulated user data (or even the hash data) the hash function can be used to efficiently detect such errors. As shown herein, additional alternative illustrative embodiments are described.

Figure 5:
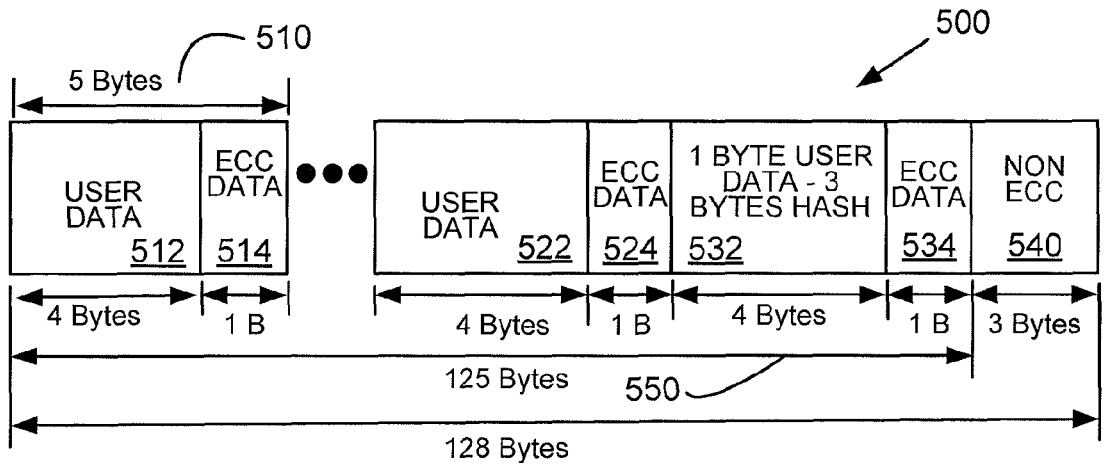
FIG. 5 is a block diagram of a flash memory data block format according to an illustrative embodiment of the present application.

Referring to FIG. 5, a block diagram of an enhanced 128 byte flash memory data block format 500 using ECC and a Hash is shown in accordance with an illustrative embodiment of FIG. 1 and the present application. User data 512 is 4 8-bit Bytes wide. A (38, 32) Hamming code is applied resulting in 6 bits that is stored in ECC data byte 514. The other 2 bits are not used. That 5 Byte ECC group 510 is then repeated 24 times ending in user data 522 and ECC data 524. Then the 25$^{th}$ ECC group is used to provide a 4 byte portion 532 including 1 byte of user data (for a total of 97 bytes user data) and 3 bytes for Hash data along with 1 byte of ECC data 534. This format results in 125 used bytes 550 in the block 500. Of the 125 used bytes, 97 bytes are used for User Data, 3 are used for Hash data and 25 are used for ECC data. In such a system, Postage Sate Files may be defined using up to 97 bytes of data for use in a postage-printing device. In an alternative, the typically unused 3 bytes 540 may be used for flag data storage. The 3 bytes 540 are not protected by the ECC system or the Hash system. Here, the 3 bytes 540 are used to determine if the block is empty, in use or needs to be erased. Since there are only 3 pieces of information or flags to be stored in the three bytes, there is a large amount of redundancy that can be used for error detection. Here, each of the 3 bytes contain identical data, namely 0xFF, 0x55 or 0x00 to indicate the respective flag data so that the system can still determine the status of the block even if several bits of 540 are corrupt.

Figure 6:
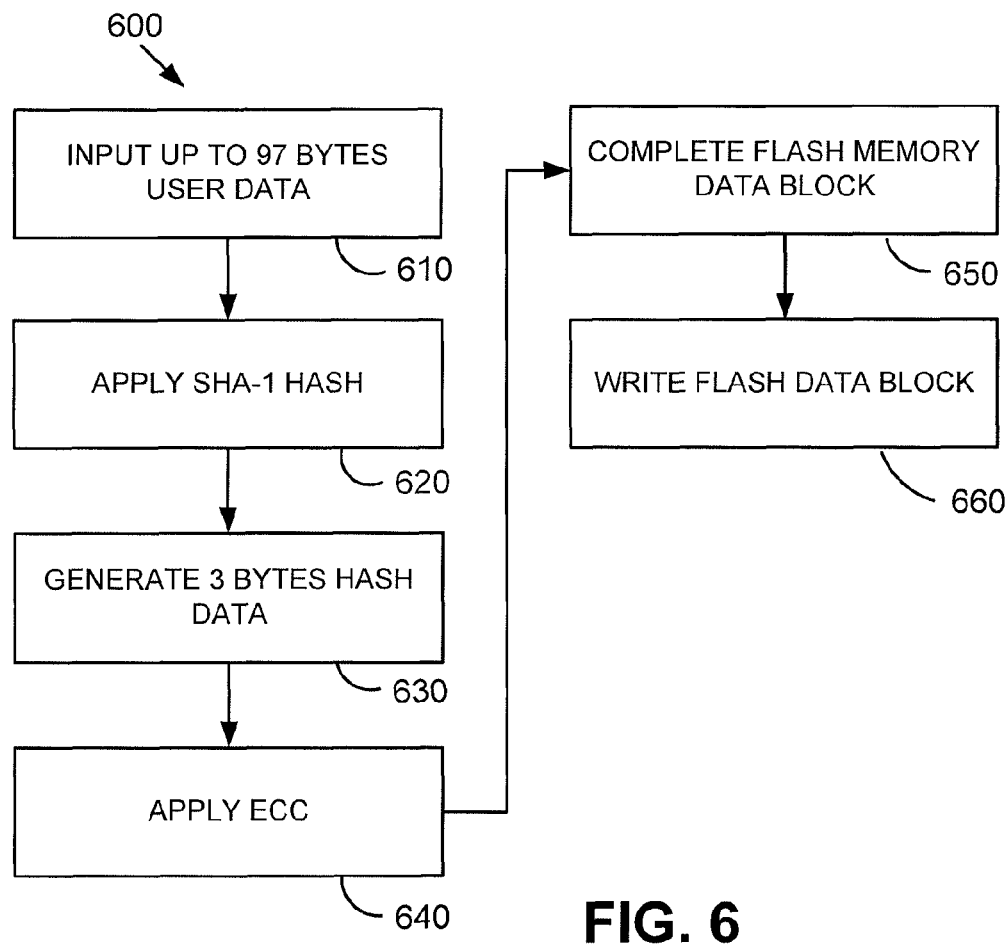
FIG. 6 is a flowchart of a flash memory write program according to an illustrative embodiment of the present application.

Referring to FIG. 6, a flowchart of a flash memory write program 600 according to an illustrative embodiment of FIG. 1 and the present application is shown. As mentioned, secure postal data records are defined including 97 bytes of data referred to as Postage State Files (PSF). In step 610, the system receives 97 bytes of user data such as a PSF. In step 620, the system applies the well-known SHA-1 hash algorithm to the user data. SHA-1 includes data padding algorithms and outputs a 20-byte hash result. Of that 20-byte hash result, the system in step 630 selects the 3 most significant bytes for use as hash data. As can now be appreciated, it is very unlikely that an error in the 97 bytes of user data could coincide with a corresponding undetectable error in the 3 bytes of hash data. In an alternative, different hash output bytes may be stored for comparison and other Hash algorithms may be used.

In step 640, the system presents the 97 bytes of user data and appended 3 bytes of hash data to the ECC algorithm as 100 bytes of data. The ECC system then applies the A (38, 32) Hamming code resulting in 125 bytes of data used to complete the 128-byte flash data block in step 650. In step 660, the flash memory algorithm writes that completed flash data block from RAM to the flash memory device.

Figure 7:
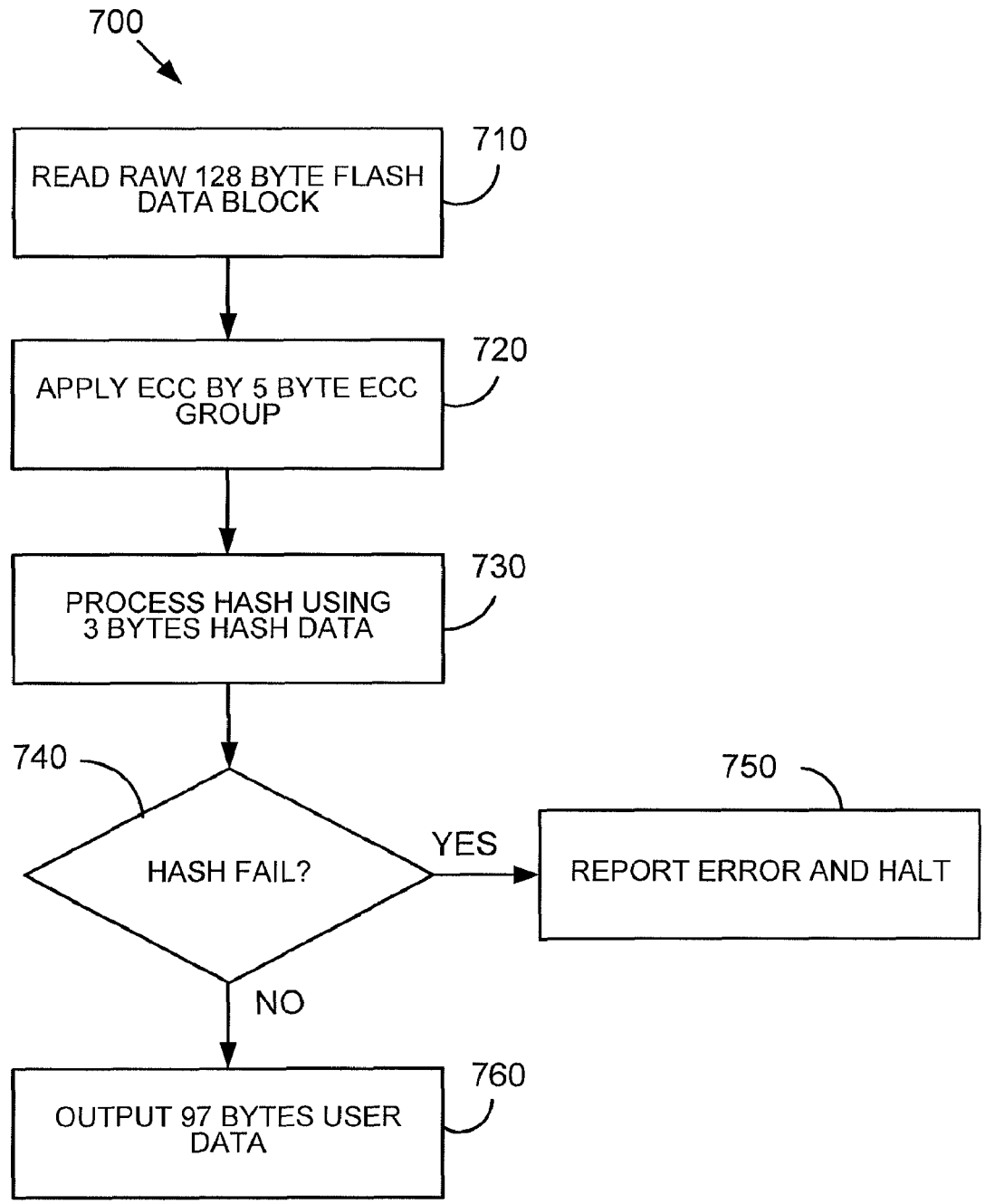
FIG. 7 is a flowchart of a flash memory read program according to an illustrative embodiment of the present application.

Referring to FIG. 7, a flowchart of a flash memory read program 700 according to an illustrative embodiment of FIG. 1 and the present application is shown. When a data is written to flash for the first time, a hash of the secure data is calculated. Then, an ECC is computed of the secure data and the hash. The hash is a unique number that can only be calculated if the secure data is completely accurate. Therefore, a more robust, but efficient ECC correction algorithm can be implemented. In step 710, the system reads the raw 128-byte flash memory data block including the secure data, the ECC data and the hash data. In step 720, the system applies the ECC algorithm for each 5 byte ECC group including the 97 bytes of data and the 3 bytes of hash data. In that step, if the ECC matches, the ECC portion of the algorithm terminates. If the ECC does not match, the ECC algorithm corrects the data in RAM. In step 730, the system calculates a comparison copy of the Hash of any such corrected data in RAM. In step 740, if the stored hash data does not match the comparison copy of the hash, the hash check fails. In step 750, if the hash check fails, then there has been corruption in more bits than the ECC can correct. Accordingly, the system reports an error and then halts operation. In step 760, if the hash check does not fail, the system outputs 97 bytes of user data to the operating system, main program or other calling program. In an alternative, the read system exits with the 97 bytes of data if the ECC algorithm indicates correct data without defects.

As can now be appreciated, the Hash provides an efficient integrity check that allows the use of a less robust, but faster and smaller ECC system to meet the stringent performance requirements of the postage printing system.

In an alternative, corrective action may be applied when the hash fails. If there are a small amount of bits to be tested, the application could flip each bit and then calculate a hash. Eventually it will find the corrupt bit if a single bit error has occurred. In another alternative, the ECC employed utilizes an algorithm that indicates which byte had an error. Then, each bit in the corrupt byte could be flipped and the hash can be recalculated. A matching hash would result in the error being corrected. In yet another alternative, when the application program detects such a hash failure, the application can also flag the error and upload the flash data to another device such as a co-located processor or a remote data center. The other device may have a backup copy of the data stored and that backup copy may then be used in order to determine where the error has occurred.

The useful life of the flash memory device is increased by the illustrative embodiments described herein. Each flash line can be written with a ECC and hash. Since ECC corrects bit errors, flash life can be prolonged since a defective device that causes errors can still be used while the errors can be corrected by the ECC. Using the hash extends it even longer as further corrections can be made and corruption can be avoided. This allows a flash with some bad cells or retention issues to still be used and thus, increases the life of the product that includes the flash memory device.

ECC algorithms are usually described generally as follows. A message is written as a set of symbols or characters. These are not necessarily normal symbols; they often for example are elements of a Galois field. Additional symbols calculated using the ECC encoding algorithm are appended to the message. The message plus ECC symbols combination is called a valid codeword. The ECC decoding algorithm finds the "closest" valid codeword to a string of symbols. If there are too many errors, then the closest valid codeword may be incorrect. Accordingly, as described herein, there is usually a design issue regarding how robust the ECC must be and also whether false corrections can be tolerated. If the ECC is not used to correct the maximum number of errors, then the unused error correction acts as additional redundancy. For example, if the ECC can handle 10 errors, but it is only used to correct up to five errors, then the extra 5 symbols provides additional redundancy that provides assurance that the message is correct. Using this method, if there are more errors than the system will automatically correct (say 7 errors in the previous example), then the ECC decode can still give a best guess (that could very well be incorrect).

The illustrative embodiments described herein add additional redundancy such as a Hash in addition to any ECC redundancy that can be checked to be sure the result of the ECC is correct. There are several additional advantages of using a hash to provide additional redundancy to an ECC system. Initially, as described herein, the hash may be easier to calculate than a large ECC that can correct a large number of errors and therefore may be more efficient than employing a more robust ECC system. The ECC system may operate on a first size of data such as 4 bytes of user data in a 5 byte ECC group. However, the hash may be applied across a broader data set such as the entire 97-byte user data block. Additionally, a large hash (say 60 bits) would make it highly unlikely to ever correct something to a wrong codeword. The probability is $2^{(-\text{number of bits in the hash})}$. As an additional example, a password could be added into the hash that would protect against tampering with the data.

In an alternative, the system separately generates the ECC of the data and the hash of the data. The ECC will then not be used to correct the hash, which allows for more possible error correction of the data. Then calculate the hash and observe the Hamming distance between the recorded hash and the calculated hash. If the distance is small (not many bit errors compared to the hash length) then the correction is most likely OK. This avoids the necessity to calculate the ECC on the hash.

In another alternative embodiment, the data block is composed of a first contiguous data section followed by a $2^{nd}$ contiguous hash data section that may include all or some of the output bits of the hash algorithm, finally followed by a $3^{rd}$ contiguous ECC data section wherein the ECC algorithm processes the user data and hash data sections. In yet another alternative, other hash-like algorithms may be utilized instead of SHA-1 including cyclical redundancy check (CRC) codes and checksums. In a further alternative, the systems and methods described herein may be utilized with other memory technologies including EEPROM and CMOS. As can now be appreciated, a first error process such as a SHA-1 hash algorithm may be applied once to the entire user block of data and the output truncated to provide a sufficient integrity check. In another alternative, the first error process may also be applied to subgroups of data. A second error process such as a traditional 1-bit ECC process can be applied to subgroups of data such as the 4 byte (with 1 byte ECC data) ECC groups. The subgroups may even include some user data and some hash data, all user data and/or all hash data. As an alternative, the second error process can be applied to the entire data block or other subgroups. Furthermore, alternative ECC algorithms or other error detection/correction algorithms may be utilized.

Commonly-owned, co-pending U.S. patent applications including Ser. No. 11/317,998, filed Dec. 22, 2005 and entitled Method for Manipulating State Machine Storage in a Small Memory Space, Ser. No. 11/317,996, filed Dec. 22, 2005 and entitled Method and Apparatus for Maintaining a Secure Software Boundary, Ser. No. 11/317,997, filed Dec. 22, 2005 and entitled Low Cost System And Method For Updating Secure Data In Internal Flash While Driving Motors And Printing, Ser. No. 11/317,463, filed Dec. 22, 2005 and entitled Apparatus And Method To Limit Access To Selected Sub-Program In A Software System, and Ser. No. 11/317,464, filed Dec. 22, 2005 and entitled Secure Software System and Method for a Printer are incorporated by reference herein in their entirety and describes systems and methods for processing customized postage that alternatively may be advantageously utilized with the systems and methods described herein.

Commonly-owned, co-pending U.S. patent application Ser. No. 11/415,307, filed May 1, 2006 and entitled Apparatus and Materials for Two-Stage Printing of Value Indicia is incorporated by reference herein in its entirety and describes systems and methods for processing customized postage that alternatively may be advantageously utilized with the systems and methods described herein. Commonly-owned, co-pending U.S. patent application Ser. No. 11/172,182, filed Jun. 30, 2005 and entitled Control Panel Label For A Postage Printing Device is incorporated by reference herein in its entirety and describes systems and methods for processing customized postage that alternatively may be advantageously utilized with the systems and methods described herein.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Various alternatives and modifications can be devised by those skilled in the art without departing from the invention. Accordingly, the present invention is intended to embrace all such alternatives, modifications and variances that fall within the scope of the appended claims. Accordingly, the invention is not to be considered as limited by the foregoing description.

What is claimed is:
1. A method of increasing data reliability of a memory device comprising:
   applying a first error process to a first data group resulting in first error process data;
   applying a second error process to the first data group and the first error process data resulting in second error process data;

storing the first data group, the first error process data and the second error process data to the memory device as a second data group.

2. The method according to claim 1 wherein the memory device is a flash memory device.

3. The method according to claim 2 wherein the first error process is a hash process and the first error process data includes hash data.

4. The method according to claim 3 wherein the first error process is a SHA-1 hash process that is applied to the entire first data group.

5. The method according to claim 2 wherein the second error process is an Error Correction Code (ECC) process.

6. The method according to claim 5 wherein the ECC process is applied to subgroups of the first data group including appended hash data.

7. The method according to claim 6 wherein the ECC process utilizes a (38, 32) Hamming code.

8. The method according to claim 4 wherein the hash data is a subset of the output of the SHA-1 hash process.

9. A method of increasing data reliability of a memory device by detecting uncorrectable errors in the memory device utilizing a first error process resulting in a first error process data and a second error process resulting in a second error process data comprising:
    obtaining a raw data group from the memory device including a first data group, first error process data and second error process data, wherein the second error process data was generated based upon the first data group and the first error process data;
    determining if the second error process data is consistent with the first data group and the first error process data by utilizing the second error process;
    if the second error process data is not consistent with the first data group and the first error process data, utilizing the second error process to generate a corrected data group and corrected first error process data;
    determining if the corrected first error process data is consistent with the corrected data group by utilizing the first error process;
    if the corrected first error process data is not consistent with the corrected data group, then indicating a failure and halting operation; and
    if the corrected first error process data is consistent with the corrected data group, then outputting the corrected data group.

10. The method according to claim 9 wherein the memory device is a flash memory device.

11. The method according to claim 10 wherein the first error process is a hash process and the first error process data includes hash data.

12. The method according to claim 11 wherein the first error process is a SHA-1 hash process and wherein the hash data is a subset of the output of the SHA-1 hash process.

13. The method according to claim 10 wherein the second error process is an Error Correction Code (ECC) process.

14. The method according to claim 13 wherein the ECC process is applied to subsets of the first data group.

15. The method according to claim 14 wherein the ECC process utilizes a (38, 32) Hamming code.

16. The method according to claim 9 further comprising:
    if the corrected first error process data is not consistent with the corrected data group, sending the flash memory data contents to another device before halting operation.

17. A postage printing system achieving increased data reliability comprising:
    a memory device; and
    a controller coupled to the memory device, the controller configured to include:
    means for obtaining a raw data group from the memory device including a first data group, first error process data and second error process data, wherein the second error process data was generated based upon the first data group and the first error process data;
    means for determining if the second error process data is consistent with the first data group and the first error process data by utilizing the second error process;
    means for utilizing the second error process to generate a corrected data group and corrected first error process data if the second error process data is not consistent with the first data group and the first error process data;
    means for determining if the corrected first error process data is consistent with the corrected data group by utilizing the first error process;
    means for indicating a failure and halting operation if the corrected first error process data is not consistent with the corrected data group; and
    means for outputting the corrected data group if the corrected first error process data is consistent with the corrected data group.

18. The system according to claim 17 wherein the memory device is a flash memory device.

19. The system according to claim 18 wherein,
    the first error process is a SHA-1 hash process and the first error process data includes hash data;
    the second error process is an Error Correction Code (ECC) process that is applied to subsets of the user data block and that utilizes a (38, 32) Hamming code; and
    the hash data is a subset of the output of the SHA-1 hash process.

20. The system according to claim 18 wherein the controller is further configured to include:
    means for sending the flash memory contents to another device if the corrected first error process data is not consistent with the corrected data group.

* * * * *